US008214794B2

(12) United States Patent
Nigul et al.

(10) Patent No.: US 8,214,794 B2
(45) Date of Patent: Jul. 3, 2012

(54) POPULATING INFORMATION CONTAINED IN JAVA ANNOTATIONS INTO EXISTING EMF MODELS

(75) Inventors: Leho Nigul, Richmond Hill (CA); Ernest W. Mah, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1154 days.

(21) Appl. No.: 12/043,349

(22) Filed: Mar. 6, 2008

(65) Prior Publication Data

US 2009/0228863 A1 Sep. 10, 2009

(51) Int. Cl.
*G06F 9/44* (2006.01)

(52) U.S. Cl. .......................................................... 717/104

(58) Field of Classification Search ........................ None
See application file for complete search history.

(56) References Cited

U.S. PATENT DOCUMENTS

| | | | | |
|---|---|---|---|---|
| 7,458,062 | B2 | 11/2008 | Coulthard et al. | |
| 7,565,364 | B1 | 7/2009 | Darcy et al. | |
| 7,644,050 | B2 | 1/2010 | Berg et al. | |
| 2007/0079299 | A1 * | 4/2007 | Daly | 717/141 |
| 2007/0179962 | A1 * | 8/2007 | Hernandez-Sherrington et al. | 707/101 |
| 2008/0077849 | A1 | 3/2008 | Adams et al. | |
| 2008/0222602 | A1 * | 9/2008 | Vaziri-Farahani et al. | 717/116 |
| 2009/0037805 | A1 | 2/2009 | Theobald | |

OTHER PUBLICATIONS

Rongfa Philip Wang, USPTO Office Action, U.S. Appl. No. 12/115,588, Notification Date Dec. 22, 2011, 13 pages.

* cited by examiner

*Primary Examiner* — Philip Wang
(74) *Attorney, Agent, or Firm* — Hoffman Warnick LLC; Daniel McLoughlin

(57) ABSTRACT

A core idea of the present approach is to provide a mapping format (and corresponding utility code for handling such mapping) that would allow the specification of mappings between parts of an EMF model and the corresponding Java annotations. Based on this mapping, the code in this framework utilizes generic EMF APIs to populate EMF model objects from information obtained in the Java annotations.

18 Claims, 2 Drawing Sheets

POPULATING INFORMATION CONTAINED IN JAVA ANNOTATIONS INTO EXISTING EMF MODELS

BACKGROUND OF THE INVENTION

Java annotations are a new way to represent meta-data directly in the Java source code. This meta data often represents certain domain model. Eclipse Modeling Framework (EMF) is a very popular framework for model representation, and there are a lot of real-life models that are represented by EMF. Since Java annotations provide greater simplicity and flexibility in specifying meta data, it is expected that more and more users will use them to provide representation of meta-data that is already represented in existing EMF models. Many of these EMF based domain models are well established and in heavy use by clients, so it would be advantageous to find an easy way to incorporate information contained in Java annotations into the existing EMF models. This allows these models to be reused without having the existing tooling around them rewritten. Brute force approach to this problem would be to obtain all the information for all domain annotations and write some code that will be able to create corresponding EMF object implementations for all possible permutations of the information obtained from Java annotations. Since many real life EMF models contain hundreds of objects, this approach is not feasible in most cases.

In view of the foregoing, there exists a need for a solution that solves at least one of the problems in the related art.

SUMMARY OF THE INVENTION

A core idea of the present approach is to provide a mapping format (and corresponding utility code for handling such mapping) that would allow the specification of mappings between parts of an EMF model and the corresponding Java annotations. Based on this mapping, the code in this framework utilizes generic EMF APIs to populate EMF model objects from information obtained in the Java annotations. This approach to populating EMF based models with information from Java annotations is certainly preferable to handling each Java annotation with the static EMF domain specific function calls.

A first aspect of the present invention provides a method for populating an Eclipse Modeling Framework (EMF) model, comprising: specifying the EMF model; specifying a location of a file that describes the EMF meta model to Java annotations mapping; extracting information from the Java annotations in Java source files; and populating the EMF model using information from the Java annotations.

A second aspect of the present invention provides a system for populating an Eclipse Modeling Framework (EMF) model, comprising: a module for specifying the EMF model; a module for specifying a location of a file that describes the EMF meta model to Java annotations mapping; a module for extracting information from the Java annotations in Java source files; and a module for populating the EMF model using information from the Java annotations.

A third aspect of the present invention provides a program product stored on a computer readable medium for populating an Eclipse Modeling Framework (EMF) model, the computer readable medium comprising program code for causing a computer system to: specify the EMF model; specify a location of a file that describes the EMF meta model to Java annotations mapping; extract information from the Java annotations in Java source files; and populate the EMF model using information from the Java annotations.

A fourth aspect of the present invention provides a method for deploying an application for populating an Eclipse Modeling Framework (EMF) model, comprising: providing a computer infrastructure being operable to: specify the EMF model; specify a location of a file that describes the EMF meta model to Java annotations mapping; extracting information from the Java annotations in Java source files; and populate the EMF model using information from the Java annotations.

A fifth aspect of the present invention provides a data processing system for populating an Eclipse Modeling Framework (EMF) model, comprising: a memory medium having instructions; a bus coupled to the memory medium; and a processor coupled to the bus that when executing the instructions causes the data processing system to: specify the EMF model; specify a location of a file that describes the EMF meta model to Java annotations mapping; extract information from the Java annotations in Java source files; and populating the EMF model using information from the Java annotations.

BRIEF DESCRIPTION OF THE DRAWINGS

These and other features of this invention will be more readily understood from the following detailed description of the various aspects of the invention taken in conjunction with the accompanying drawings in which.

Figure 1:
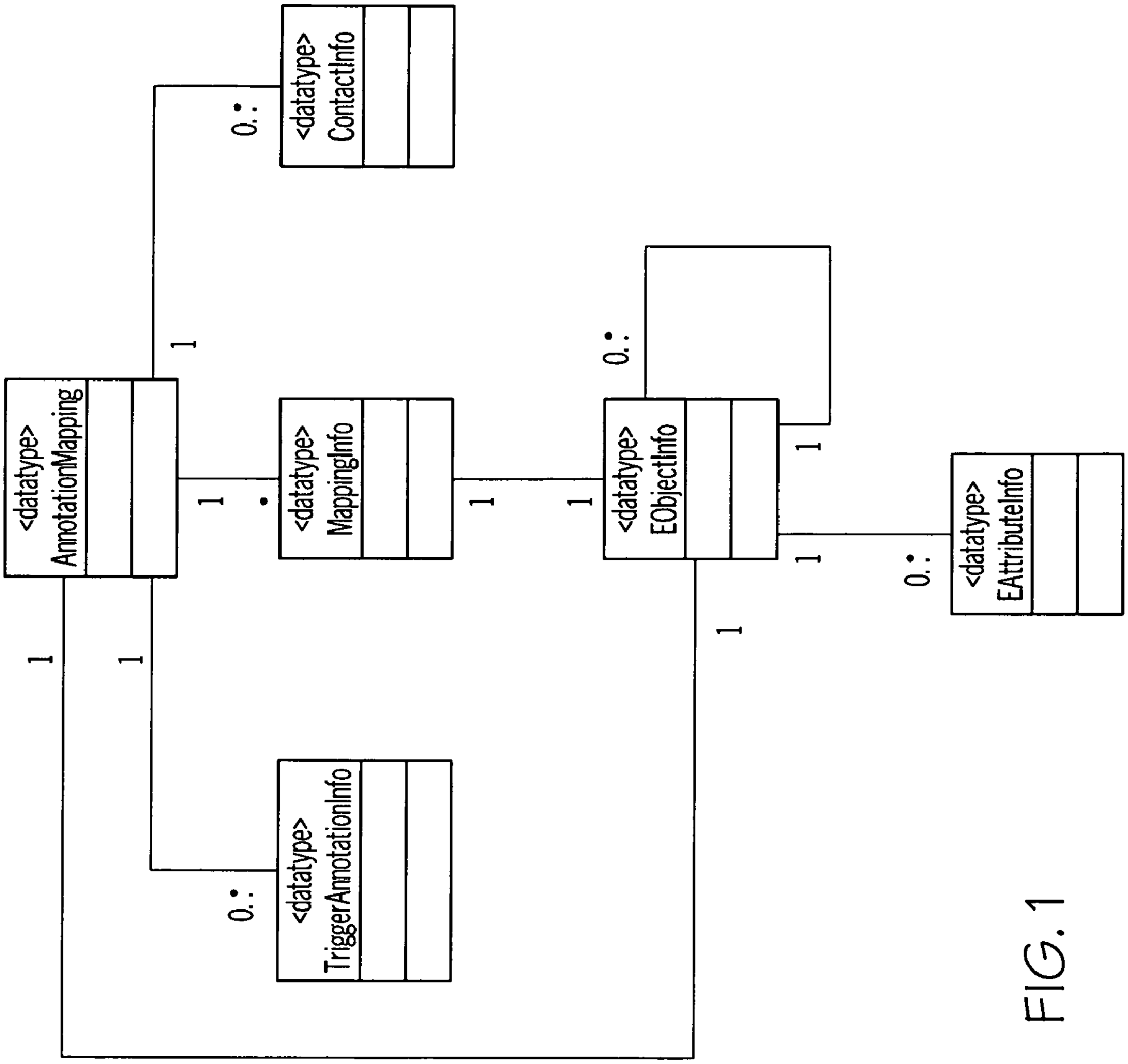
FIG. 1 graphically depicts a relationship between elements according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:

I. General Description

II. Computerized Implementation

I. General Description

A core idea of the present approach is to provide a mapping format (and corresponding utility code for handling such mapping) that would allow the specification of mappings between parts of an EMF model and the corresponding Java annotations. Based on this mapping, the code in this framework utilizes generic EMF APIs to populate EMF model objects from information obtained in the Java annotations.

To establish a meaningful mapping, users will create a mapping XML file that adheres to schema format that we defined. A visual mapping tool can be easily created, making the creation of this mapping file very trivial. In terms of the design for mapping definition and implementation most of the design is based on the concept of "trigger annotation" (or "component defining annotation"), this is a Java annotation that is meaningful by itself and does not require the presence of any other Java annotations to define certain model artifact. For example in EJB 3.0 the existence of @Stateless annotation at the class level defines that the java class is a stateless session bean. On the other hand @Timeout annotation in the EJB 3.0 domain is only relevant in the context of session or message driven beans, i.e. this annotation is meaningful ONLY when @Stateless or @MessageDriven annotations are already present in the code, and is not meaningful by itself. That means that this is NOT a trigger annotation. Some annotations can be trigger or not trigger annotations depending on where they are defined in the Java code. Another important design concept is top-down EMF model population. We assume that we start with top level EClass object and then go through all annotations in the given Java-natured project and populate the EMF model per mappings defined in the mapping XML. The following section describes some of the most important parts of the mapping file:

Document Root

At the root of XML document we must have 3 types of elements:

<triggerAnnotations>, <eClass> and <AnnontationMapping>.

<triggerAnnonations>

List all the trigger annotation names (as defined above) for the given domain.

For example:

```
<triggerAnnotations>
<Name>Stateless</Name>
<Name>Stateful</Name>
</triggerAnnotations>
```

<eClass>

Specifies the EClass object that corresponds to most top level object in the domain specific EMF model.

Example: <eClass name="EJBPACKAGE.getEJBJar"/>

<AnnotationMapping>

It is probably the most important element. This element defines the actual mapping between given annotation (specified by "name" attribute of the element) and certain objects in EMF model. This element has one required and one optional attribute. The required attribute is "name" and it corresponds to the name of the annotation. Optional attribute is "eFeatureName" which corresponds to the feature name of the EMF object that maps to given annotation. This attribute is optional because annotation can map not only to EObject, but also directly to some EAttribute on parent EObject, and therefore no new EObject instance need to be created for given mapping. <AnnotationMapping> element can contain one required and 3 optional elements. <requiredTopEObject> Is an optional element that specifies that certain parent EObject should be created (if not already exists) before mapping relationship can be applied. For example, in EJB 3.0 domain, before @Stateless tag can be processed, we have to make sure that EObject corresponding to EJBPACKAGE.getEJBJar_EnterpriseBeans structural feature is created. Therefore we have to define it in a following way:

```
<requiiredTopEObject
<eObject eFeatureName="EJBPACKAGE.getEJBJar__EnterpriseBeans"/>
</requiredTopEObject>
```

We will explain the notion of <eObject> element later in this disclosure.

<mapping>

This is a required element that defines mapping specific to the given Java annotation (there can be multiple mappings that are specific to the certain Java annotation). This element must contain one <eObject> element, which roughly represents the EObject in the EMF side of mapping. Each <eObject> can have an optional attribute "eFeatureName" which, if present would signify that new EObject instance corresponding to EStructural feature with this name should be created. If this attribute is not present, it will be implied and <eObject> element refers to existing top level EObject. <eObject> element can have a child <eObject> (which represents child/container relationship in the EMF model) and unlimited number of <eAttribute> elements that roughly represent EAttribute elements in the EMF model AND define the actual mapping rules. In general there can be 3 different types of mapping: Java annotation attribute to EAttribute JavaElement name (type, field, method—depending were annotation is specified) to EAttribute Predefined hard coded value to EAttribute. The type of the mapping is defined by targetType of the <eAttribute> element. Let's consider the following example which specifies the mappings for @Stateless Java annotation from EJB 3.0 domain

```
<mapping>
<eObject>
<eAttribute targetName="className" targetType="JavaElement"
eFeatureName="EJBPACKAGE.getSessionBean__EjbClass"/>
</eObject>
</mapping>
<mapping>
<eObject>
<eAttribute targetName="name" targetType="AnnotationAttribute"
eFeatureName="EJBPACKAGE.getSessionBean__EjbName"/>
</eObject>
</mapping>
<mapping>
<eObject>
<eAttribute targetName="mappedName"
targetType="AnnotationAttribute"
eFeatureName="EJBPACKAGE.getSessionBean__MappedName"/>
</eObject>
</mapping>
<mapping>
<eObject eFeatureName="EJBPACKAGE.-
getSessionBean__Descriptions">
<eAttribute targetName="description" targetType="AnnotationAttribute"
eFeatureName="JAVAEEPACKAGE.getDescription__Value"/>
</eObject>
</mapping>
```

From that example we can see that attributes "name" and "mappedName" for the @Stateless Java annotation map to EAttributes defined by "EJBPACKAGE.getSessionBean_EjbName" and "EJBPACKAGE.getSessionBean_ MappedName" structural feature.

We can also see that Java type name for the type on which @Stateless Java annotation is defined corresponds to the EAttribute specified by "EJBPACKAGE.getSessionBean_EjbClass" structural feature. Finally, we see that "description" attribute of @Stateless Java annotation corresponds to the EAttribute defined by "JAVAEEPACKAGE.getDescription_ Value" structural feature and this EAttribute is itself is present in the EObject defined by "EJBPACKAGE.getSession Bean_ Descriptions" structural feature.

<triggerAnnotation>

This optional tag specifies that given Java annotation has specific mappings only when it is present in the context of some other annotation (this "other" Java annotation is always a trigger Java annotation). This element can have an optional attribute eFeatureName which value defines trigger sensitive EObject that should be created in the EMF model. Let's consider the triggerAnnotations definitions for @PreDestroy annotation from EJB 3.0 domain

```
<triggerAnnotation
eFeatureName="EJBPACKAGE.getSessionBean__PreDestroys">Stateless
</triggerAnnotation>
<triggerAnnotation
eFeatureName="EJBPACKAGE.getSessionBean__PreDestroys">Stateful
</triggerAnnotation>
<triggerAnnotation
eFeatureName="EJBPACKAGE.getMessageDrivenBean__PreDestroys">
MessageDriven</triggerAnnotation>
```

From this example we can see that @PreDestroy Java annotation is relevant only when @Stateless, @Stateful or @MessageDriven annotations are also defined. If this annotation is present together with @Stateless Java annotation, then EMF object corresponding to "EJBPACKAGE.getSessionBean_PreDestroys" EStructural feature will be created. If it is present together with @MessageDriven, then "EJBPACKAGE.getMessageDrivenBean_PreDestroys" feature name will be used to create the EObject in the model <context>

This is an optional element that defines specific context in which annotation maps to EMF model object, as there are a number of annotations that can map to different EMF objects depending on such context. One of the best examples is @Resource Java annotation from EJB 3.0 domain. If it is defined on some field of simple type, it corresponds to Environment Entry, if is defined on field of type DataSource, it corresponds to different EMF object, etc. Let's consider the example of mapping between @Resource annotation and environment entry EMF object:

```
<AnnotationMapping name="Resource">
<triggerAnnotation
eFeatureName="EJBPACKAGE.getSessionBean__EnvEntries">
Stateless</trigger
Annotation>
<triggerAnnotation
eFeatureName="EJBPACKAGE.getSessionBean__EnvEntries">
Stateful</triggerAnnotation>
<triggerAnnotation
eFeatureName="EJBPACKAGE.-
getMessageDrivenBean__EnvEntries">Message
Driven</triggerAnnotation>
<context targetType="AnnotationAttribute" targetName="type">
<value>java.lang.String.class</value>
<value>java.lang.Integer.class</value>
<value>java.lang.Boolean.class</value>
<value>java.lang.Byte.class</value>
<value>java.lang.Character.class</value>
<value>java.lang.Short.class</value>
<value>java.lang.Long.class</value>
<value>java.lang.Float.class</value>
<value>java.lang.Double.class</value>
</context>
```

As we can see these mapping will ONLY be applied to the @Resource annotations whose type Java annotation attribute value corresponds to one of simple types. Examples above do not describe that full content of mapping file, they are listed to demonstrate how the mapping relationships are specified and recorded Java Objects Representing Mapping Information from Mapping File In the sections above we considered different parts of the mapping file that represent the mapping between EMF parts of the model and Java annotations. When our framework parses the mapping files, the following objects are created and populated AnnotationMapping—Represents the information contained in the <AnnotationMapping> element in the mapping file.

Contextinfo—Represents the information contained in the <context> element in the mapping file.

EAttributeinfo—Represents the information contained in the <eAttribute> element in the mapping file.

EObjectinfo—Represents the information contained in the <eObject> element in the mapping file.

Mappinginfo—Represents the information contained in the <mapping> element in the mapping file.

TriggerAnnotationinfo—Represents the information contained in the <triggerAnnotations> element in the mapping file.

Graphically the relationship between these elements can be represented as shown in FIG. 1.

Model Population Implementation

We will describe the process of EMF model population from information provided by Java annotation on the example of @Stateless annotation from EJB 3.0 domain. Consider the following sample Java class:

```
@Stateless(name="HelloWorld", mappedName="MappedName")
@Local(value={MyLocalInterface.class})
public class Test {
    public String helloWorld( )
        return "Hello World";
}
}
```

The sample mapping for this annotation will look as following:

```
<root xmlns:xsi="http://www.w3.org/2001/XMLSchema-instance"
xsi:noNamespaceSchemaLocation="EJBMappings.xsd">
<triggerAnnotations>
<Name>Stateless</Name>
</triggerAnnotations>
<eClass name="EJBPACKAGE.getEJBJar"/>
<AnnotationMapping name="Stateless" eFeatureName=
"EJBPACKAGE.getEnterpriseBeans__SessionBeans">
<requiredTopEObject>
<eObject eFeatureName="EJBPACKAGE.getEJBJar__EnterpriseBeans"
/>
</requiredTopEObject>
<mapping>
<eObject>
<eAttribute targetName="className" targetType="JavaElement"
eFeatureName="EJBPACKAGE.getSessionBean__EjbClass"/>
</eObject>
</mapping>
<mapping>
<eObject>
<eAttribute targetName="name" targetType="AnnotationAttribute"
eFeatureName="EJBPACKAGE.getSessionBean__EjbName"/>
</eObject>
</mapping>
<mapping>
<eObject>
<eAttribute targetName="mappedName" targetType=
"AnnotationAttribute"
eFeatureName="EJBPACKAGE.getSessionBean__MappedName"/>
</eObject>
</mapping>
</AnnotationMapping>
<AnnotationMapping name="Local">
<triggerAnnotation>Stateless</triggerAnnotation>
<triggerAnnotation>Stateful</triggerAnnotation>
<mapping>
<eObject>
<eAttribute targetName="value" targetType="AnnotationAttribute"
```

-continued

```
eFeatureName="EJBPACKAGE.getSessionBean__BusinessLocals"/>
</eObject>
</mapping>
</AnnotationMapping>
</root>
```

The framework code of the present invention will go through the following steps:

(1) Load the mapping file and populate mapping data structures (for performance reasons, the mapping file is only loaded once)

(2) Find the eClass for the EMF model and create the instance of it if required (EJBPACKAGE.getEJBJar from example above)

(3) From the mapping information, get the list of trigger annotations (4) For each of the trigger annotations detected in the Java source, do the following:

(a) Determine if any additional EMF object models should exist before the EMF object corresponding to the Java annotation can be populated. This information is provided by requiredTopEObject and in the example above it declares, that EJBPACKAGE.getEJBJar_EnterpriseBeans should exist in the EMF model BEFORE anything can done with regards to given Java annotation, therefore in our code we will create this top level EMF object if it doesn't already exist. b) After that EMF object corresponding to the Java annotation will be created (EJBPACKAGE.getEnterpriseBeans_ SessionBeans in our example)

(c) After that we look if there are any mappings defined between EAttributes of this EMF object and information from the Java annotation. If we follow the example above we see that EJBPACKAGE.getSessionBean-EjbClass eAttribute corresponds to the java element on which @Stateless annotation is defined, which in our case is type name Test. We also see that: JBPACKAGE.getSessionBean_EjbName and EJBPACKAGE.getSessionBean_MappedName eAttributes correspond to name and mappedName of the @Stateless Java annotation and therefore will be populated with "HelloWorld" and "MappedName" values.

(5) Next the code looks for Java annotations that are associated with the given trigger annotation (based on the information in the mapping file). In our example above such annotation is @Local annotation which is relevant only in the context of @Stateless Java annotation (this information is denoted by <triggerAnnotation> element in the mapping file ).

(6) If any such annotation is found, it is handled in the similar fashion to step 4. In the example above, the value of: EJBPACKAGE.getSessionBean_BusinessLocals attribute on the EObject element corresponding to the stateless session bean, will be set to array of one element with value of {MyLocalInterface.class}.

Iterating over these steps for will allow us to fully populate EMF mode from the information in Java annotations based on the provided map file.

Summary

EMF models are usually quite complex and might include hundreds of objects for a large domain. Our invention allows the incorporation of meta data provided by Java annotations into existing models defined through EMF. This saves end users tremendous effort of redefining model interfaces and/or writing the code to transform meta data provided through Java annotations into existing domain models represented by EMF. Our invention also offers the benefit of plugability and extensibility. For example if certain domain rules in handling annotations are changed (change in the domain specifications), only mapping file has to be modified, and no code change is needed. Also, if certain Java annotations are added/removed to/from the domain, again only mapping file will be to be modified to react to this change. This plugability and extensibility helps therefore to better maintain Java code, saves the users from error prone code changes AND allows doing modifications quickly. It should also be noted that since the mapping format is rather simple, the mapping tool can be easily created to help define mappings between EMF features and corresponding annotations.

II. Computerized Implementation

Figure 2:
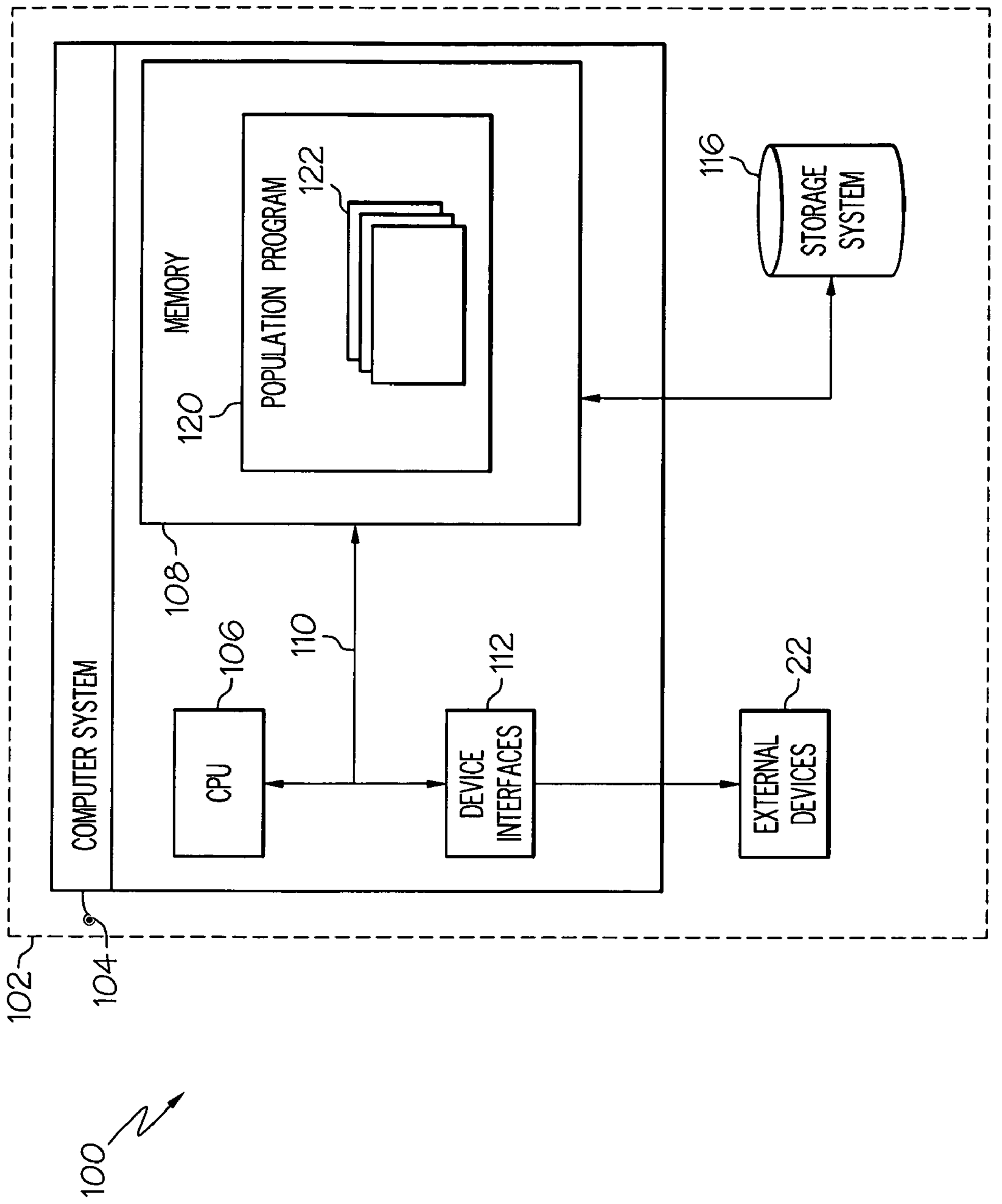
FIG. 2 depicts a more specific computerized implementation according to an embodiment of the present invention.

Referring now to FIG. 2, a computerized implementation 100 of an embodiment of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system/register 104 includes a processing unit 106, a memory 108, a bus 110, and device interfaces 112. Further, computer system/register 104 is shown external devices 114 and storage system 116 that communicate with bus via device interfaces. In general, processing unit 106 executes computer program code, such as population program 120, which are stored in memory 108 and/or storage system 116. While executing computer program code, processing unit 106 can read and/or write data to/from memory 108, storage system 116, and/or device interfaces 112. Bus 110 provides a communication link between each of the components in computer system/register 104. Although not shown, computer system/register 104 could also include I/O interfaces that communicate with: one or more external devices such as a cash register, a keyboard, a pointing device, a display, etc.; one or more devices that enable a user to interact with computer system/register 104; and/or any devices (e.g., network card, modem, etc.) that enable computer system/register 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system/register 104 is only representative of various possible computer systems that can include numerous combinations of hardware. To this extent, in other embodiments, computer system/register 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external device 114. Still further, it is understood that one or more additional components (e.g., system software, math co-processing unit, etc.) not shown in FIG. 2 can be included in computer system/register 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system/register 104.

Shown in memory 108 of computer system/register 104 is population program 120, which includes a set (at least one) of modules 122. The modules generally provide the functions of the present invention as described herein. For example (among other things), set of modules 122 is configured to provide and/or enable the following: specifying the EMF model; specifying a location of a file that describes the EMF meta model to Java annotations mapping; extracting information from the Java annotations in Java source file; and populating the EMF model using information from the Java annotations; loading the mapping file; running the mapping file; extracting the information from the Java annotations, prior to the populating; obtaining a list of trigger annotations from the mapping file; determining if additional EMF model models should exist, prior to the populating; creating the EMF model corresponding to the Java annotation; and determining if any mappings are defined between the EMF model and information from the Java annotation; looking for Java annotations associated with a given trigger annotation; etc.

While shown and described herein as a population approach and program item, it is understood that the invention further provides various alternative embodiments. For example, in one embodiment, the invention provides a computer-readable/useable medium that includes computer program code to enable a computer infrastructure to provide EMF model population. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 2) and/or storage system 116 (FIG. 2) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide EMF model population. In this case, the service provider can create, maintain, and support, etc., a computer infrastructure, such as computer infrastructure 102 (FIG. 2) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for populating EMF models. In this case, a computer infrastructure, such as computer infrastructure 102 (FIG. 2), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system/register 104 (FIG. 2), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or processing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for populating an Eclipse Modeling Framework (EMF) model, performed on at least one computing device having instructions stored on memory executed by a processor, the method comprising:

specifying the EMF model, using the at least one computing device;

specifying a location of a file that describes the EMF model to Java annotations mapping, using the at least one computing device, wherein the EMF model to Java annotations mapping includes:

at least one Java annotation specified by a name attribute of an element;

a trigger annotations tag for denoting a list of names of each of the at least one Java annotation configured to enable a section of the EMF model to Java annotations mapping; and an annotation mapping tag denoting a definition of a mapping between the at least one Java annotation and an object within the EMF model;

extracting information from the Java annotations in Java source files; and populating the EMF model using information from the Java annotations.

2. The method of claim 1, the mapping file comprising an extensible markup language (XML) file.

3. The method of claim 1, further comprising:

loading the mapping file;

running the mapping file; and extracting the information from the Java annotations, prior to the populating.

4. The method of claim 1, further comprising obtaining a list of trigger annotations from the mapping file.

5. The method of claim 4, further comprising, for each trigger annotations in the list of trigger annotations:

determining if additional EMF model models should exist, prior to the populating;

creating the EMF model corresponding to the Java annotation; and determining if any mappings are defined between the EMF model and information from the Java annotation.

6. The method of claim 5, further comprising looking for Java annotations associated with a given trigger annotation.

7. A system comprising:

at least one computing device, having instructions stored on memory executed by a processor, the at least one computing device for populating an Eclipse Modeling Framework (EMF) model, the at least one computing device including:

a module for specifying the EMF model;

a module for specifying a location of a file that describes the EMF model to Java annotations mapping, wherein the EMF model to Java annotations mapping includes:

at least one Java annotation specified by a name attribute of an element;

a trigger annotations tag for denoting a list of names of each of the at least one Java annotation configured to enable a section of the EMF model to Java annotations mapping; and an annotation mapping tag denoting a definition of a mapping between the at least one Java annotation and an object within the EMF model;

a module for extracting information from the Java annotations in Java source files; and a module for populating the EMF model using information from the Java annotations.

8. The system of claim 7, the mapping file comprising an extensible markup language (XML) file.

9. The system of claim 7, further comprising:

a module for loading the mapping file;

a module for running the mapping file; and a module for extracting the information from the Java annotations, prior to the populating.

10. The system of claim 7, further comprising a module for obtaining a list of trigger annotations from the mapping file.

11. The system of claim 10, further comprising:

a module for determining if additional EMF model models should exist, prior to the populating;

a module for creating the EMF model corresponding to the Java annotation; and a module for determining if any mappings are defined between the EMF model and information from the Java annotation.

12. The system of claim 11, further comprising a module for looking for Java annotations associated with a given trigger annotation.

13. A program product stored on a non-transitory computer readable medium for populating an Eclipse Modeling Framework (EMF) model, the non-transitory computer readable medium comprising program code for causing a computer system to:

specify the EMF model;

specify a location of a file that describes the EMF meta model to Java annotations mapping, wherein the EMF model to Java annotations mapping includes:

at least one Java annotation specified by a name attribute of an element;

a trigger annotations tag for denoting a list of names of each of the at least one Java annotation configured to enable a section of the EMF model to Java annotations mapping; and an annotation mapping tag denoting a definition of a mapping between the at least one Java annotation and an object within the EMF model;

extract information from the Java annotations in Java source files; and populate the EMF model using information from the Java annotations.

14. The program product of claim 13, the mapping file comprising an extensible markup language (XML) file.

15. The program product of claim 13, the computer readable medium further comprising program code for causing the computer system to:

loading the mapping file;

running the mapping file; and extracting the information from the Java annotations, prior to the populating.

16. The program product of claim 13, the computer readable medium further comprising program code for causing the computer system to:

obtaining a list of trigger annotations from the mapping file.

17. The program product of claim 16, the computer readable medium further comprising program code for causing the computer system to:

determine if additional EMF model models should exist, prior to the populating;

create the EMF model corresponding to the Java annotation; and determine if any mappings are defined between the EMF model and information from the Java annotation.

18. The program product of claim 17, the computer readable medium further comprising program code for causing the computer system to look for Java annotations associated with a given trigger annotation.

* * * * *